United States Patent Office

3,796,772
Patented Mar. 12, 1974

3,796,772
FLAME RETARDANT POLYMER COMPOSITION CONTAINING IN ADMIXTURE CALCIUM TITANATE
John B. Luce, Mount Vernon, Ind., assignor to General Electric Company
No Drawing. Filed Jan. 3, 1972, Ser. No. 215,155
Int. Cl. C08g 39/10
U.S. Cl. 260—860      4 Claims

ABSTRACT OF THE DISCLOSURE

A flame retardant polymer composition having in admixture therewith certain titanates and halogen containing flame retardant additives.

The invention relates to a thermoplastic polymer composition having excellent flame retardant properties and more particularly, polymer compositions having in admixture therewith particular titanates.

BACKGROUND OF THE INVENTION

It is well known in the art to prepare flame retardant polymer compositions such as flame retardant polycarbonates by employing halogen substituted bisphenol-A in the preparation thereof. Specifically, U.S. Pat. 3,334,154 discloses such a composition wherein tetrabromobisphenol-A is employed to prepare a polycarbonate composition having excellent flame retardant properties. In addition, other polymers are made flame retardant by adding halogen containing flame retardant additives to such polymers as high impact polystyrenes and acrylonitrile-butadiene-styrene terpolymers. Flame retardant properties of thermoplastic compositions are extremely high in demand by the industry as a safety feature requirement. In fact, many applications for thermoplastics carry the requirement that the thermoplastic be flame retardant particularly where they are used by the public or are employed in areas where the public may gather.

With the development and production of supersonic aircraft and other transportation vehicles wherein there is the need for utmost safety for passengers being carried therein, there is a great demand that the materials as supplied therein in the fabrication of such vehicles be flame retardant or nonflammable. Even though a thermoplastic may have flame retardant properties, it will, nevertheless, melt and drip upon exposure to heat. Such dripping can come into contact with combustibles and thereby cause burning of such combustibles. The modes of public transportation being developed are now using extensive amounts of plastic materials because of their high strength to weight ratio and because of the esthetic properties that they can impact to the vehicle. Therefore, the added safety requirements calls for plastic materials to exhibit controlled dripping. Many of the flame retardant compositions exhibit severe dripping which is conducive to spreading fire even though such polymers may be classified as flame resistant or flame retardant polymers.

DESCRIPTION OF THE INVENTION

According to this invention, it has now been discovered that by incorporating with a flame retardant polymers certain titanate additives these polymers can be rendered non dripping as in the case of a polycarbonate or non ignition of combustible material from polymer dripping such as high impact polystyrent and acrylonitrile-butadiene-styrene polymers. More specifically, the polycarbonate composition of this invention consists of (a) a copolymer of an unsubstituted dihydric phenol and a halogen substituted dihydric phenol and (b) a blend of (a) with a homopolymer of an unsubstituted dihydric phenol. Preferably, the mixture may be 30–99 weight percent and more particularly 70–99 weight percent of an unsubstituted dihydric phenol and, correspondingly, 70–1 weight percent and more particularly 30–1.0 weight percent of a carbonate copolymer consisting of (1) 75–25 weight percent of a halogen substituted dihydric phenol and, correspondingly, (2) 25–75 weight percent of an unsubstituted phenol, based on the total weight of (1) and (2). Particularly, this preferred system employs a tetra halogen substituted dihydric phenol and more particularly a tetrabromobisphenol-A. The flame retardant polycarbonate composition of this invention consists of the above polycarbonate in admixture with 0.01–2.0 weight percent of calcium titanate.

Another flame retardant polymer composition of this invention consists of a terpolymer of a vinyl aromatic-acrylonitrile-butadiene having in admixture 5–30 weight percent of a halogen containing flame retardant and 0.01 to about 20 weight percent of either calcium titanate or nickel titanate or a mixture thereof. The halogen containing flame retardant additive may be typically such well known materials as hexabromobenzene, hexachlorobenzene, hexabromobiphenyl, hexachlorobiphenyl, decabromobiphenyl, decachlorobiphenyl decabromobiphenyl ether, decachlorobiphenyl ether 2,2-(3′,5′,5′-tetrabromo-4,4′-dihydroxy-diphenyl) propane, 2,2-(3,3′,5,5′-tetrachloro-4,4′-dihydroxy-diphenyl) propane, an adduct of cyclohexane and hexachlorocyclopentadiene (chloran), etc.

The other polymer composition of this invention consists of a styrene polymer of at least 50 weight percent of styrene having in admixture therewith 5 to 30 weight percent of a halogen containing flame retardant and 0.01 to about 20 weight percent of nickel titanate. The halogen containing therein p-tertiary butylphenol, pyridine and the same as set forth previously. The styrene polymer may be either a styrene homopolymer or a styrene copolymer of at least 50 weight percent of styrene with the balance being any other monomer copolymerizable with styrene monomer. This also includes the high impact polystyrene which are prepared by polymerizing styrene in the presence of polybutadiene to graft copolymerize the polybutadiene onto the styrene polymer chain that is formed during polymerization of the styrene monomer. Also included are the styrene-butadiene block and random copolymers wherein the butadiene may be present in an amount of from 10–50 weight percent of the styrene polymer.

The halogens employed in all cases are of either the halogen substituted dihydric phenols or the halogen containing flame retardant additives are bromine or chlorine mixtures thereof in the same compound or monomer.

DESCRIPTION OF THE PREFERRED EMBODIMENT

The following examples are set forth herein to illustrate in more detail the preferred embodiment and to illustrate more clearly the principal and practice of this invention to those skilled in the art.

EXAMPLE I

A molding composition is prepared by mixing (a) 1 part of a copolymer prepared by reacting 50 weight percent of 2,2 - bis(4-hydroxyphenyl) propane (hereinafter referred to as bisphenol-A), 50 weight percent of 2,2-(3,3′5,5′ - tetrabromo-4,4′-dihydroxy-diphenyl) propane and phosgene in a methylene chloride reaction medium containing therein p-tertiary butylphenyl, pyridine and calcium hydroxide, and (b) 4 parts of a bisphenol-A homopolymer prepared by reacting bisphenol-A with phosgene in a methylene chloride reaction medium containing therein triethylamine, p-tertiary butylphenol and calcium hydroxide. The polymer blend is then mixed with 0.1 weight percent of calcium titanate and extruded at a temperature of about 525° F. The extrudate is comminuted into pellets.

The above composition is then injection molded into test specimens of 5" x ½" x 1/16" thick. Test bars are also molded without the calcium titanate added.

The test bars are then subjected to the Underwriters Laboratories (U.L. Bulletin 94 Flame Test). The results are as follows:

TABLE 1

| Additive: | Flame out (seconds) |
|---|---|
| 0 | [1] 10 |
| Calcium titanate (0.1%) | [2] 2-3 |

[1] Dripping of the polymer occurred and ignited cotton underlayment.
[2] No dripping of the polymer occurred.

EXAMPLE II

Eight (8) parts of an acrylonitrile-butadiene-styrene terpolymer (35, 20 and 45 weight percent respectively) is blended with 2 parts of hexabromobenzene. Separate blends are then prepared with 0.5 weight percent of nickel titanate and 0.5 weight percent of calcium titanate respectively.

Each composition is then extruded and injection molded into test bars under the same conditions as in Example I above, except that 1/8" thick bars are prepared. Test bars are also molded without the titanate additives.

The test bars are then subjected to the U.L. Bulletin 94 Flame Test and the results are as follows:

TABLE 2

| Additive: | Flame out (seconds) |
|---|---|
| 0 | [1] 15 |
| Nickel titanate | [2] 10 |
| Calcium titanate | [2] 10 |

[1] Dripping of the polymer occurred and ignited cotton underlayment.
[2] Dripping of the polymer occurred but of the non-flaming type and did not ignite cotton underlayment.

EXAMPLE III

A blend of 8 parts of high impact polystyrene and 2 parts of hexabromobenzene is prepared. This mixture is then blended with 1.0 weight percent of nickel titanate. The mixture is extruded and injection molded into test bars under the same conditions as in Example II.

The test bars are subjected to the U.L. Bulletin 94 Flame Test. Test bars without the nickel titanate are also prepared. The results are as follows:

TABLE 3

| Additive: | Flame out (seconds) |
|---|---|
| 0 | [1] 15 |
| Nickel titanate | [2] 10 |

[1] Dripping of the polymer occurred and ignited cotton underlayment.
[2] Dripping of the polymer occurred but of the non-flaming type and did not ignite cotton underlayment.

As shown in the examples, the addition of the particular titanate with the flame retardant polymer rendered the polymer either nondripping or if dripping occurred, the dripping did not ignite the combustible material around it. It is the combination of the titanate with the halogen that offers this effect. Without the titanate additive, even the so-called flame retardant polymers caused burning of combustible material due to dripping polymer.

In the practice of this invention, the other halogen flame retardant additives set forth previously can be employed in place of the hexabromobenzene used in the examples with essentially the same results.

In general, the unsubstituted and halogen substituted dihydric phenols employed herein are the dihydric bisphenols or polynuclear aromatic compounds, containing as functional groups, two hydroxyl radicals, each of which is attached directly to a carbon atom of an aromatic nucleus. Typical of some of the dihydric phenols that may be employed in the practice of this invention are bis(4-hydroxyphenyl) methane,
2,2-bis(4-hydroxyphenyl) propane (bisphenol-A),
2,2-bis(4-hydroxy-3-methylphenyl)propane,
4,4-bis(4-hydroxyphenyl) heptane,
2,2-(3,3',5,5'-tetrachloro-4,4'-dihydroxy-diphenyl)
  propane (tetrachlorobisphenol-A),
2,2-(3,3',5,5'-tetrabromo-4,4'-dihydroxy-diphenyl)
  propane (tetrabromobisphenol-A),
3,3'-dichloro-4,4'-dihydroxyphenyl methane, etc.

Other dihydric phenols of the bisphenol type are also available and are disclosed in U.S. Pats. 2,999,835, 3,028,365 and 3,334,154.

Generally, the polycarbonate employed herein may be prepared by reacting a dihydric phenol with a carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A flame retardant polymer composition consisting of a mixture of a carbonate polymer and 0.01–2.0 weight percent of calcium titanate, and wherein said carbonate polymer is a blend of a copolymer of an unsubstituted dihydric phenol and halogen substituted dihydric phenol with homopolymers of unsubstituted dihydric phenols; said halogen being selected from the group consisting of bromine and chlorine.

2. The composition of claim 1 wherein the carbonate polymer is a mixture of 30–99 weight percent of a homopolymer of a dihydric phenol and correspondingly, 70–1 weight percent of a copolymer of 25–75 weight percent of a dihydric phenol and 75–25 weight percent of a tetrahalogenated dihydric phenol.

3. The composition of claim 2 wherein the copolymer consists of bisphenol-A and tetrachloro bisphenol-A.

4. The composition of claim 2 wherein the copolymer consists of bisphenol-A and tetrabromo bisphenol-A.

References Cited
UNITED STATES PATENTS

| 3,647,747 | 3/1972 | Bialous | 260—860 |
| 3,334,154 | 8/1967 | Kim | 260—860 |
| 3,078,250 | 2/1963 | Thompson | 260—41 |
| 3,403,129 | 9/1968 | Kargin et al. | 260—45.75 |

WILLIAM H. SHORT, Primary Examiner
E. WOODBERRY, Assistant Examiner

U.S. Cl. X.R.
260—45.75 R, 45.75 N